(12) United States Patent
Agam et al.

(10) Patent No.: US 9,947,090 B2
(45) Date of Patent: Apr. 17, 2018

(54) MEDICAL IMAGE DECTECTION SYSTEM AND METHOD

(71) Applicant: RaPID Medical Technologies, LLC, Chicago, IL (US)

(72) Inventors: Gady Agam, Naperville, IL (US); Gan Lin, Urbana, IL (US)

(73) Assignee: RaPID Medical Technologies, LLC, Chicago, IL (US)

( * ) Notice: Subject to any disclaimer, the term of this patent is extended or adjusted under 35 U.S.C. 154(b) by 148 days.

(21) Appl. No.: 14/846,885

(22) Filed: Sep. 7, 2015

(65) Prior Publication Data

US 2016/0071264 A1 Mar. 10, 2016

Related U.S. Application Data

(63) Continuation of application No. PCT/US2015/048742, filed on Sep. 6, 2015.

(60) Provisional application No. 62/046,926, filed on Sep. 6, 2014.

(51) Int. Cl.
| | |
|---|---|
| *G06T 7/00* | (2017.01) |
| *G06T 11/60* | (2006.01) |
| *G06K 9/32* | (2006.01) |
| *G06K 9/62* | (2006.01) |

(52) U.S. Cl.
CPC .......... *G06T 7/0012* (2013.01); *G06K 9/3241* (2013.01); *G06K 9/6256* (2013.01); *G06T 11/60* (2013.01); *G06K 2209/057* (2013.01); *G06T 2200/24* (2013.01); *G06T 2207/10116* (2013.01); *G06T 2207/20036* (2013.01); *G06T 2207/20081* (2013.01); *G06T 2207/30052* (2013.01)

(58) Field of Classification Search
CPC ... G06T 7/0012; G06T 11/60; G06T 2200/24; G06T 2207/10116; G06T 2207/20036; G06T 2207/20081; G06T 2207/30052; G06K 9/3241; G06K 9/6256; G06K 2209/057
USPC ......................................................... 382/128
See application file for complete search history.

(56) References Cited

U.S. PATENT DOCUMENTS

2005/0123181 A1* 6/2005 Freund ................. G02B 21/365
382/128

* cited by examiner

*Primary Examiner* — Amandeep Saini
(74) *Attorney, Agent, or Firm* — Kevin R. Erdman; Brannon Sowers & Cracraft PC

(57) ABSTRACT

The present invention involves a foreign object detection system and method which involves combining several algorithms specifically enhanced for foreign object detection to provide an improved detection system.

19 Claims, 5 Drawing Sheets

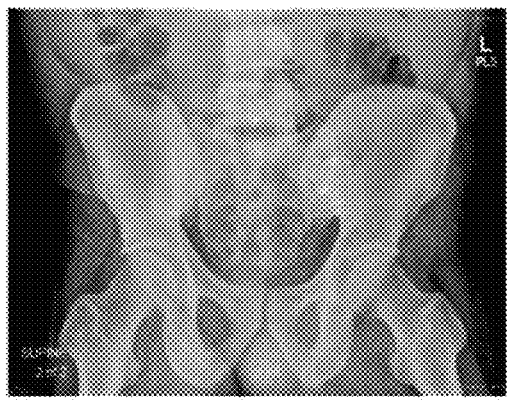 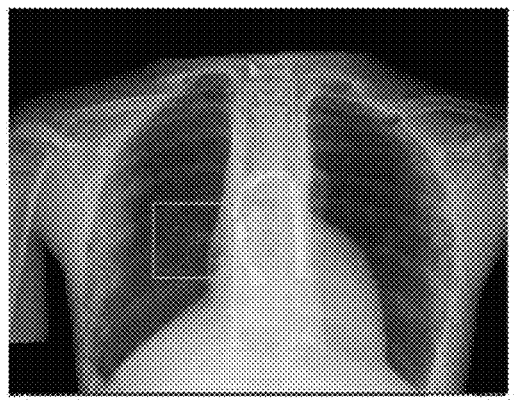
Figure 4A  Figure 4B

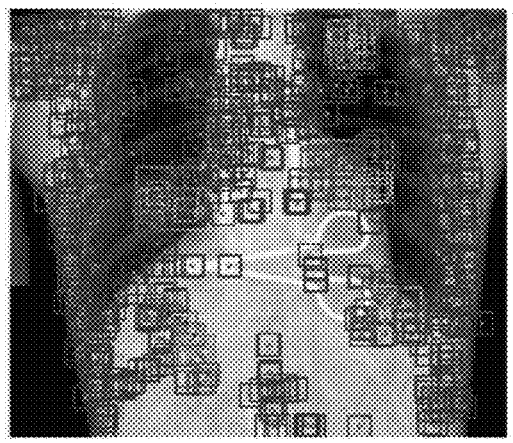 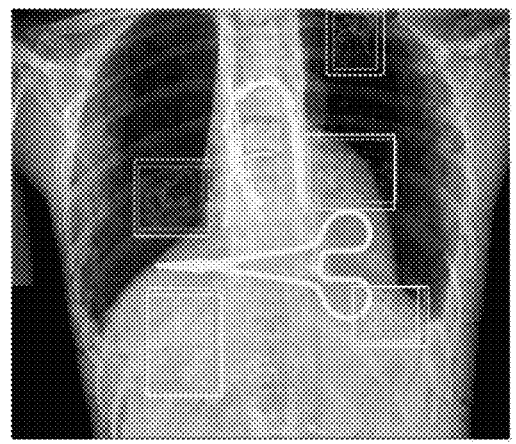
Figure 5A                    Figure 5A

MEDICAL IMAGE DECTECTION SYSTEM AND METHOD

CROSS-REFERENCE TO RELATED APPLICATIONS

The present application is a continuation of PCT International Application Serial Number PCT/US15/48742, filed Sep. 6, 2015, and claims priority under 35 U.S.C. § 119 of U.S. Provisional Patent Application Ser. No. 62/046,926, filed Sep. 6, 2014, the disclosures of which are incorporated by reference herein.

BACKGROUND OF THE INVENTION

Field of the Invention

The invention relates to medical imaging software. More specifically, but not exclusively, the field of the invention is that of medical image detection software for detecting non-body objects.

Description of the Related Art

Techniques are know for the identification of implanted medical devices ("IMDs") and retained foreign objects ("RFOs") in medical images.

Approximately 25 million patients in the United States have or have had an implanted medical device ("IMD"). Driven by a rapidly increasing aged population and supported by new technologies, the demand for IMDs and their further proliferation can only be expected to increase.

An IMD is a medical device that is partly or totally surgically inserted into the human body or a natural orifice and is expected to remain implanted for an extended period or may be permanent. IMDs can further be classified as either active, those that use electricity, or passive, those that do not use electricity. In the US, medical devices are regulated by the FDA and classified into three classes, on basis of risk and the level of regulatory control that is necessary to assure the safety and effectiveness: class I, class II, and class III. Class III devices include devices that generally affect the functioning of vital organs and/or life support systems with very high health risk if the device were to malfunction.

Identification of an IMD during patient admission, and especially in emergencies, is crucial for the safe and efficient management of that patient. Concerns with the accurate and timely identification of IMDs are an emerging safety issue. Of particular concern is the commonly encountered situation where medical records are not available and/or the patient is unable to provide the appropriate information/documentation regarding the IMD he has. Most commonly IMDs are initially reported by patients or noted on admission and/or emergency xrays ("XRs"), magnetic resonance images ("MRI"), ultrasound or computerized tomography ("CT") images, necessitating, often ineffective, attempts to gather more information regarding the device in question. This usually involves contacting the patient's family, primary care providers or health care institutions previously visited by the patient. Even when such attempts are successful, available information about the patient's device is often incomplete, unreliable and delayed. On the other hand, the large variety, rapidly increasing number approved by FDA, and difficult projections/orientations of IMDs in medical images (XR, CT, or MRI) make their identification very difficult for radiology specialists. Possible consequences include: delayed appropriate diagnostic imaging and care, medical complications arising from device incompatibility with imaging or therapeutic modalities, and suboptimal care due to inappropriate avoidance of treatment and diagnostic procedures that are erroneously considered contraindicated.

Software applications facilitate initial assessment/identification, expedite the management, and improve the healthcare and safety of patients with IMDs, including those with symptoms of IMD malfunction. They also facilitate implementation of recent FDA requirements for post-market device surveillance.

Physicians are increasingly encountering patients with IMDs. Identification of an IMD, during an emergent admission in particular, is critical for safe and efficient patient management. In 2007, FDA issued a report indicating an increase in adverse events linked to medical devices, including 2,830 deaths, 116,086 injuries, and 96,485 device malfunctions. Class III active IMDs were cited in a relatively high number of fatality reports within the FDA report.

Ultra-low-power radio-frequency (RF) technology has greatly facilitated the development of IMDs. The ability to wirelessly transmit the patient's and IMD's data enables a clinician to obtain useful diagnostic information and reprogram therapeutic settings. Furthermore, radio-frequency identification (RFID) technology uses radio waves to transfer data from an electronic tag to identify and track the tagged device. However, the rapidly increasing number of IMDs and their manufacturers, absence of the standardized tools/methods capable of RF sensing, identifying, and reprogramming IMDs, radio interference problems, ethical/security issues, and the fact that many IMDs do not have RF capabilities make this technology less convenient for rapid identification. This disadvantage is particularly obvious in medical emergencies and emergency room settings.

Medical errors involving IMDs, especially those arising from their incompatibility with treatment or diagnostic procedures, are an emerging patient safety issue. Procedures incompatible with patient's devices have been performed, leading to device malfunction and other complications. Examples of such complications include: patients undergoing Magnetic Resonance Imaging (MRI) in the presence of implanted ferromagnetic devices possibly causing migration, interference with the function of implanted devices because of strong magnetic fields (MR) and disrupting electrical forces (certain types of CT or surgical electrocautery). This includes setting changes of active (none turned off) cardiac pacemakers and defibrillators and/or defibrillation shocks during surgical procedures caused by electrocautery scalpels. In another example, percutaneous catheters and ports have been damaged by exceeding their pressure ratings during therapeutic infusions, necessitating subsequent surgical interventions/exchange or repair. Furthermore, several IMDs are compatible with MRI and CT imaging but/and/or requires reprogramming after the completion of the MRI which has been frequently missed. These effects on the IMD are not always evident or immediately observed (such as unintended re-programming, e.g., ventriculo-peritoneal shunts' valves) and can not only lead to delays but also to serious and possibly disastrous complications. Conversely, there are patients that do not receive optimal treatment and diagnostic procedures, even though their devices are compatible with such treatments. For example, several pacemakers currently on the market are compatible with MRI. In these cases, disclosure software identifies these specific models as being compatible with MRI, providing the treating physicians an option to have their patient undergo a medically-indicated MRI scan safely.

Retained foreign objects (RFOs) in patients due to oversights during surgery, objects including needles and surgical instruments and/or materials, continues to be a significant problem with an incidence of between 0.3 and 1.0 per 1,000 surgeries. This has resulted in a significant increase in patient care costs and consecutive legal expenses.

Intra-operative or early post-operative identification of RFOs is critical for safe and efficient management of surgical patients. Current recommendations for prevention of RFOs in the operating room ("OR") include methodical wound exploration before closing, usage of standardized practices for surgical items accounting, usage of items with radiopaque markers within the operative site, and mandatory operative field X-rays before wound closure when an item count discrepancy occurs. In addition, radiographic screening is recommended at the end of an emergent surgical procedure, unexpected change in the procedure, and for patients with a high body mass index. Some institutions also conduct routine postoperative screening radiographs for the prevention of RFOs. Therefore portable X-ray radiological protocols have become crucial for timely RFO detection. However, they have relatively low efficacy and require significant time for completion and for evaluation. The underlying problems of their use are the relatively low sensitivity and specificity of the human eye in the identification of relatively small objects in a large X-ray field and the fact that radiologists and surgeons do not routinely undertake formal training in the recognition of RFOs.

Technological aids to assist the OR team in the detection and prevention of retained sponges, gauze towels, and laparotomy pads include radio-frequency detectable sponge systems and bar-coded sponge systems. These aids are intended to augment the standardized manual count practices, and to not replace them.

Operative field X-ray is mandatory when there is a counting discrepancy of surgical instruments or materials at the end of the procedure. According to the 2006 Patient Care Memorandum of the Department of Veterans Affairs (Boston Healthcare System, VA, USA), surgical instruments and/or materials must be counted, except for procedures that are routinely concluded with a radiograph (for example, an orthopedic case to assure proper alignment of a bone or implant). In these cases, a radiograph is mandatory if an instrument count is not performed, and the evaluation of the radiograph must be performed before the patient is transferred from the OR to determine whether any instruments have been retained. When a radiograph is requested to locate a missing item, the type of foreign object that is missing, OR number, and telephone number must be specified in the request to the radiologist. Radiographic screening is also recommended/mandatory at the end of emergent surgical procedures, unexpected changes in procedures, or in patients with high BMI (e.g. >=20). Some institutions use postoperative screening radiographs routinely. In all of these cases, the completion of the surgical case may be delayed until radiologic evaluation is received. Assuming the patient is stable, current recommendations are that in the event of an incorrect count, a X-ray of the operative field should be made available to a radiologist within 20 minutes and their evaluation/confirmation of the results of the x-ray should be provided back to the OR within another 20 minutes. This process frequently takes significantly more time than 40 minutes.

Portable X-ray is also a method of choice for determination of the relative position/location of a RFO. This is particularly important if the specific tissue layer or surgical incision/wound is already closed and additional instruments are present in the X-ray image.

While stainless steel instruments are likely to be detected successfully on radiograph screening, radiographs are less sensitive in detecting sponges and needles. Sponges may be difficult to detect because they may become twisted or folded, distorting visualization of the marker. Needles may also be difficult to visualize due to their size. The value of intraoperative and/or post-operative X-ray images for RFO identification has been controversial and very few studies have been undertaken to evaluate their effectiveness. A recent study evaluating portable X-rays for identification of retained suture needles in ophthalmologic surgical cases showed that the overall sensitivity and specificity of the physicians' review of radiographs with suspected retained needles was 54% and 77%, respectively. This is particularly worrisome considering that in this particular case the size of the surgical field was small, the area of interest well-defined, while the participants in the study have known that they were looking for the needles which should have greatly facilitated RFOs/needle detection. In the most studies when radiographs were falsely negative for RFO detection; poor-quality radiographs, multiple foreign objects in the field, and failure to communicate the purpose of the radiograph to the interpreting radiologist were cited as contributing factors. Although it is mandatory that such intra-operative radiographs be reviewed by a radiologist(s) and/or surgeon(s), it is not routine for those individual to have undertaken specific/formal training in the radiographic identification/recognition of these objects. Furthermore, the general consensus throughout the literature is that the most effective means of evaluating the presence of a RFO is through the use of CT scanning which—in most of the cases—is not possible in the OR.

Portable X-ray radiological protocols as described above, are crucial for timely RFO detection. However, such protocols have relatively low efficacy, require significant time for their completion via manual reading, and are affected by the quality of communication between the OR team and the radiologist. The underlying problem in manual reading is the need to identify small objects (e.g. needles or sponges) in a large x-ray of the operative field that already contains multiple surgical instruments (e.g. retractors or drainage catheters) and the fact that radiologists and surgeons do not have formal training in recognizing RFO's. In addition, human readers have biases such as focusing at a specific region where the object is expected to be found, or more readily dismissing cases where there is no miscount.

Retained surgical foreign objects (RSIs) in patients, including needles, sponges, surgical instruments, and other materials, is a significant problem with incidence between 0.3 and 1.0 per 1,000 surgeries. It carries a significant increase in patient care cost and consecutive legal expenses.

Intra-operative or early post-operative identification of RSIs is critical for safe and efficient management of surgical patients. Current recommendations for the prevention of the RSIs in the operation room (OR) include methodical wound exploration before closing, usage of standardized practices for surgical items accounting, usage of items with radio-opaque markers within the operative site, and operative field X-ray before wound closure when there is a counting discrepancy. In addition, radiographic screening is recommended at the end of cases involving an emergent procedure, unexpected change in procedure, or high patient body mass index. Some institutions also conduct routine postoperative screening radiographs for the prevention of RSIs.

Portable X-ray radiological protocols as described above, are crucial for timely RSI detection. However, such protocols have relatively low efficacy, require significant time for their completion via manual reading, and are affected by the quality of communication between the OR team and the radiologist. The underlying problem in manual reading is the need to identify small objects (e.g. needles or sponges) in a large X-ray of the operative field that already contains multiple surgical instruments (e.g. retractors or drainage catheters) and the fact that radiologists and surgeons do not have formal training in recognizing RSIs. In addition, human readers have biases such as focusing at a specific region where the object is expected to be found, or more readily dismissing cases where there is no miscount.

SUMMARY OF THE INVENTION

The present invention is a detection system and method which addresses the aforementioned difficulties with a robust image processing and detection algorithm. By enhancing, extracting, and classifying small portions of each image, and the result is then spatially clustering the results to determine candidates for analysis and detection.

From a technical point of view, the contribution of our methods is in several areas. First, algorithms for enhancing images and increasing the contrast in them were developed for the specific purpose of foreign object detection. Focusing the algorithms on foreign object detection increases their effectiveness compared with general enhancement algorithms. Second, algorithms were developed to effectively cope with deformable and small objects. Third, algorithms were developed distinguishing between clutter and relevant objects. Fourth, algorithms for classifying the context of images such as anatomical regions or exposure level were developed. Finally, algorithms for producing large amounts of training data were developed to overcome the problem of low RSI incidence in actual images. The combination of two or more of these algorithms in a new methodology provides significant improvements in detection.

The limitations of the prior art motivated an automated image analysis solution for RSI detection in X-ray images based on computer vision machine learning techniques. Computerized algorithms may examine the image methodically, are fast and cost effective, and are more effective in the detection of objects with small dimensions. The core algorithms are based on image enhancement, candidate detection, feature extraction, and recognition.

Further, if a RSI is identified, additional projections/portable X-rays are usually necessary to approximate its position in the surgical field. This is particularly relevant in cases of emergent abdominal or chest surgeries with relatively large operative fields. By rapidly identifying the RFSO in the different projections, software according to embodiments of the present invention also significantly shorten time needed to locate the RSI within the surgical wound. This shortens the operation, anesthesia time, and associated risks.

Detecting RSIs is a difficult and challenging problem. This is evidenced by the fact that despite the many efforts to prevent such cases, the incidence of RSIs is still relatively high. The technical challenge in developing a system for RSI lie in several areas. First, objects such as sponges are deformable making it more difficult to develop computerized algorithms for their detection. Second, objects such as needles may be small and could be hard to detect especially in cases where they attach to other structures in the image. Third, the images may contain visual clutter due to wires, catheters, surgical instruments, and texture of other anatomical structures which make it more difficult to detect and recognize the objects of interest. Fourth, the contrast of the images may be low thus making it more difficult to detect the foreign objects in them. Fifth, the context of the image such as the anatomical region or acquisition parameters may vary and thus affect the performance of the classifiers. Finally, the case of true retained surgical objects is rare, thus making it difficult to collect training and testing data.

The new method for RSI detection that works in tandem with existing protocols, and serve as an additional safeguard. Our system, routinely scan X-ray images taken in the OR for RSIs even when the focus of the image is a different issue. By using embodiments of the inventive system it is possible to reduce the incidence of RSIs and so reduce the cost and increase the quality of patient care.

From a technical point of view, the contribution of embodiments of the invention occur in several areas. First, algorithms for enhancing images and increasing the contrast we developed and tested for the purpose of foreign object detection. Focusing the algorithms on foreign object detection increases their effectiveness compared with general enhancement algorithms. Second, algorithms were developed and tested that effectively cope with deformable and small objects. Third, algorithms that distinguish between clutter and relevant objects were developed and tested. Fourth, algorithms for classifying the context of images such as anatomical regions or exposure level were developed and tested. Finally, algorithms for marking the location of RSIs in actual images were developed and tested. Combinations of such algorithms create an effective and useful computer aided decision tool for use by physicians in relation to hospital operations.

The costs related to RSIs are significant and justify investments in embodiments of the present invention. The methods and software provided increase the efficacy of RSI identification X-ray protocols, improve patient OR safety, prevent costly medical and consequent legal expenses, shorten the time needed for image analysis, and improve utilization of the OR time. These objectives are particularly important given patient outcome intensives in the Affordable Care Act. Integration of the core software into a PACS and/or portable X-ray machine software environment through their application programming interfaces (API) makes embodiments of the invention cost effective and widely applicable in everyday clinical practice.

In contrast to competing solutions which are based on RFID tagging, embodiments of the invention avoid the additional hardware cost involved with RFID tags and RFID readers, and are suitable for small items such as needles which are difficult and/or impossible to be RFID tagged. Further, in contrast to RFID tags, embodiments of the invention are not susceptible to electromagnetic noise in the OR, and provide for localization of the RSI. This approach for RSI detection in X-ray images is unique. Similar commercial systems are not available on the market.

The present invention, in one form, relates to enhancements of detection software using combinations of the aforementioned algorithms.

The present invention, in another form, is a method for developing and enhancing such algorithms.

Further aspects of the present invention involve hardware and software for implementing the detection system.

Another aspect of the invention relates to a machine-readable program storage device for storing encoded instructions for a method of foreign object detection in radiographic images according to the foregoing method.

BRIEF DESCRIPTION OF THE DRAWINGS

The above mentioned and other features and objects of this invention, either alone or in combinations of two or more, and the manner of attaining them, will become more apparent and the invention itself will be better understood by reference to the following description of an embodiment of the invention taken in conjunction with the accompanying drawings, wherein:

FIGS. 4A and 4B are radiographic photo images showing superimposed and actual sponges, respectively.

FIGS. 5A and 5B are radiographic photo images showing intermediate and final detection areas according to one embodiment of the present invention.

Figure 1:
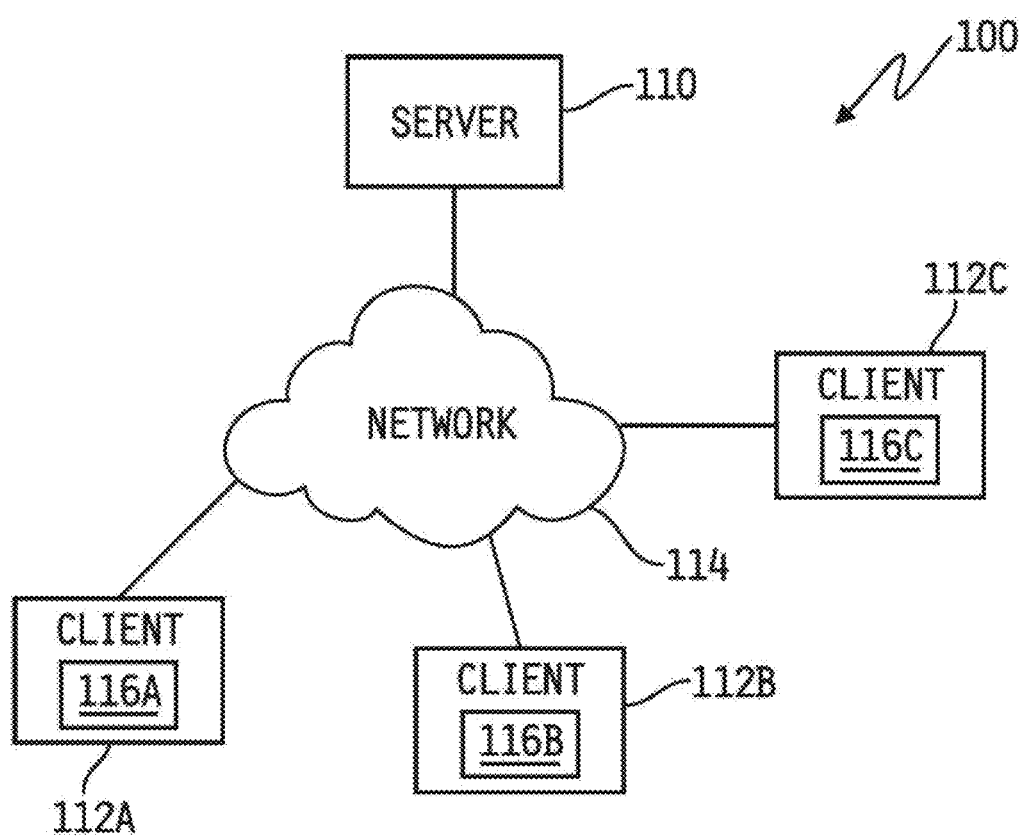
FIG. 1 is a schematic diagrammatic view of a network system in which embodiments of the present invention may be utilized.

Corresponding reference characters indicate corresponding parts throughout the several views. Although the drawings represent embodiments of the present invention, the drawings are not necessarily to scale and certain features may be exaggerated in order to better illustrate and explain the full scope of the present invention. The flow charts and screen shots are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of algorithms and symbolic representations of operations on data bits within a computer memory representing alphanumeric characters or other information. A computer generally includes a processor for executing instructions and memory for storing instructions and data. When a general purpose computer has a series of machine encoded instructions stored in its memory, the computer operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computer itself. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of embodiments of the present invention; the operations are machine operations. Useful machines for performing the operations of one or more embodiments of the present invention include general purpose digital computers or other similar devices. In all cases the distinction between the method operations in operating a computer and the method of computation itself should be recognized. One or more embodiments of present invention relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself rather as a result of an instruction.

Some embodiments of the present invention also relate to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus unless explicitly indicated as requiring particular hardware. In some cases, the computer programs may communicate or relate to other programs or equipments through signals configured to particular protocols which may or may not require specific hardware or programming to interact. In particular, various general purpose machines may be used with programs written in accordance with the teachings herein, or it may prove more convenient to construct more specialized apparatus to perform the required method steps. The required structure for a variety of these machines will appear from the description below.

Embodiments of the present invention may deal with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment. Similar to a process is an agent (sometimes called an intelligent agent), which is a process that gathers information or performs some other service without user intervention and on some regular schedule. Typically, an agent, using parameters typically provided by the user, searches locations either on the host machine or at some other point on a network, gathers the information relevant to the purpose of the agent, and presents it to the user on a periodic basis. A "module" refers to a portion of a computer system and/or software program that carries out one or more specific functions and may be used alone or combined with other modules of the same system or program.

The term "desktop" means a specific user interface which presents a menu or display of objects with associated settings for the user associated with the desktop. When the desktop accesses a network resource, which typically requires an application program to execute on the remote server, the desktop calls an Application Program Interface, or "API", to allow the user to provide commands to the network resource and observe any output. The term "Browser" refers to a program which is not necessarily apparent to the user, but which is responsible for transmitting messages between the desktop and the network server and for displaying and interacting with the network user. Browsers are designed to utilize a communications protocol for transmission of text and graphic information over a world-wide network of computers, namely the "World Wide Web" or simply the "Web". Examples of Browsers compatible with one or more embodiments of the present invention include the Chrome browser program developed by Google Inc. of Mountain View, Calif. (Chrome is a trademark of Google Inc.), the Safari browser program developed by Apple Inc. of Cupertino, Calif. (Safari is a registered trademark of Apple Inc.), Internet Explorer program developed by Microsoft Corporation (Internet Explorer is a trademark of Microsoft Corporation), the Opera browser program created by Opera Software ASA, or the Firefox browser program distributed by the Mozilla Foundation (Firefox is a registered trademark of the Mozilla Foundation). Although the following description details such operations in terms of a graphic user interface of a Browser, one or more embodiments of the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method). [0060] Similarly, JavaScript Object Notation (JSON) may be used to convert between data file formats.

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a first device, e.g. a handheld device, and a second device, e.g. a desktop computer, either via wires or wirelessly. Synchronization ensures that the data on both devices are identical (at least at the time of synchronization).

In wireless wide area networks, communication primarily occurs through the transmission of radio signals over analog, digital cellular or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), Third Generation (wideband or "3G"), Fourth Generation (broadband or "4G"), personal digital cellular ("PDC"), or through packet-data technology over analog systems such as cellular digital packet data ("CDPD") used on the Advance Mobile Phone Service ("AMPS").

The terms "wireless application protocol" or "WAP" mean a universal specification to facilitate the delivery and presentation of web-based data on handheld and mobile devices with small user interfaces. "Mobile Software" refers to the software operating system which allows for application programs to be implemented on a mobile device such as a mobile telephone or PDA. Examples of Mobile Software are Java and Java ME (Java and JavaME are trademarks of Sun Microsystems, Inc. of Santa Clara, Calif.), BREW (BREW is a registered trademark of Qualcomm Incorporated of San Diego, Calif.), Windows Mobile (Windows is a registered trademark of Microsoft Corporation of Redmond, Wash.), Palm OS (Palm is a registered trademark of Palm, Inc. of Sunnyvale, Calif.), Symbian OS (Symbian is a registered trademark of Symbian Software Limited Corporation of London, United Kingdom), ANDROID OS (ANDROID is a registered trademark of Google, Inc. of Mountain View, Calif.), and iPhone OS (iPhone is a registered trademark of Apple, Inc. of Cupertino, Calif.), and Windows Phone 7. "Mobile Apps" refers to software programs written for execution with Mobile Software.

The terms "x-ray", "image" or "scan" or derivatives thereof refer to x-ray (XR), magnetic resonance imaging (MRI), computerized tomography (CT), sonography, cone beam computerized tomography (CBCT), or any system that produces a quantitative spatial representation of a patient or object. "PACS" refers to Picture Archiving and Communication System (PACS) involving medical imaging technology for storage of, and convenient access to, images from multiple source machine types. Electronic images and reports are transmitted digitally via PACS; this eliminates the need to manually file, retrieve, or transport film jackets. The universal format for PACS image storage and transfer is DICOM (Digital Imaging and Communications in Medicine). Non-image data, such as scanned documents, may be incorporated using consumer industry standard formats like PDF (Portable Document Format), once encapsulated in DICOM. A PACS typically consists of four major components: imaging modalities such as X-ray computed tomography (CT) and magnetic resonance imaging (MRI) (although other modalities such as ultrasound (US), positron emission tomography (PET), endoscopy (ES), mammograms (MG), Digital radiography (DR), computed radiography (CR), etc. may be included), a secured network for the transmission of patient information, workstations and mobile devices for interpreting and reviewing images, and archives for the storage and retrieval of images and reports. When used in a more generic sense, PACS may refer to any image storage and retrieval system.

FIG. 1 is a high-level block diagram of a computing environment 100 according to one embodiment. FIG. 1 illustrates server 110 and three clients 112 connected by network 114. Only three clients 112 are shown in FIG. 1 in order to simplify and clarify the description. Embodiments of the computing environment 100 may have thousands or millions of clients 112 connected to network 114, for example the Internet. Users (not shown) may operate software 116 on one of clients 112 to both send and receive messages network 114 via server 110 and its associated communications equipment and software (not shown).

Figure 2:
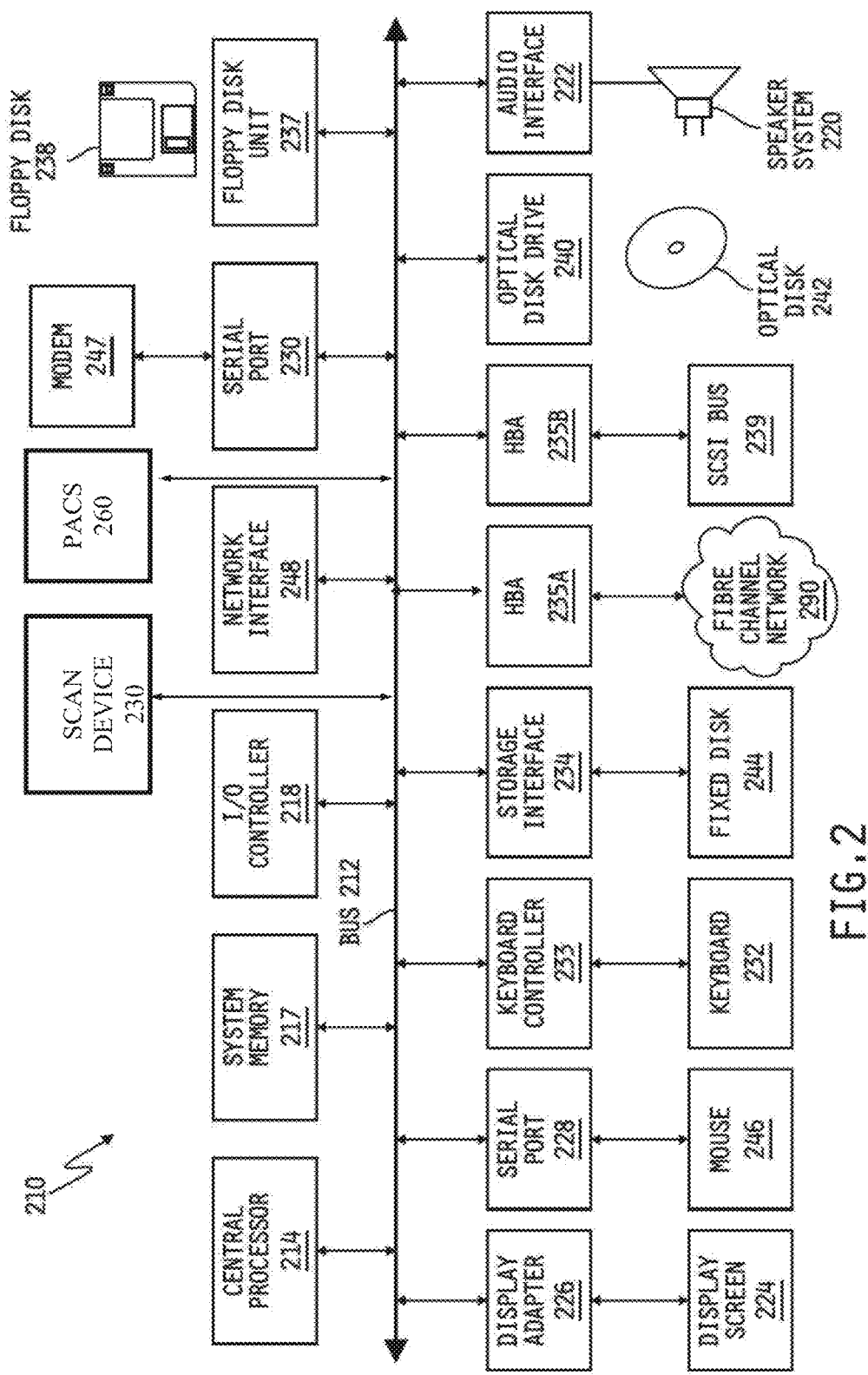
FIG. 2 is a block diagram of a computing system (either a server or client, or both, as appropriate), with optional input devices (e.g., keyboard, mouse, touch screen, etc.) and output devices, hardware, network connections, one or more processors, and memory/storage for data and modules, etc. which may be utilized in conjunction with embodiments of the present invention.

FIG. 2 depicts a block diagram of computer system 210 suitable for implementing server 110 or client 112. Computer system 210 includes bus 212 which interconnects major subsystems of computer system 210, such as central processor 214, system memory 217 (typically RAM, but which may also include ROM, flash RAM, or the like), input/output controller 218, external audio device, such as speaker system 220 via audio output interface 222, external device, such as display screen 224 via display adapter 226, serial ports 228 and 230, keyboard 232 (interfaced with keyboard controller 233), storage interface 234, disk drive 237 operative to receive floppy disk 238, host bus adapter (HBA) interface card 235A operative to connect with Fibre Channel network 290, host bus adapter (HBA) interface card 235B operative to connect to SCSI bus 239, and optical disk drive 240 operative to receive optical disk 242. Also included are mouse 246 (or other point-and-click device, coupled to bus 212 via serial port 228), modem 247 (coupled to bus 212 via serial port 230), and network interface 248 (coupled directly to bus 212).

Bus 212 allows data communication between central processor 214 and system memory 217, which may include read-only memory (ROM) or flash memory (neither shown), and random access memory (RAM) (not shown), as previously noted. RAM is generally the main memory into which operating system and application programs are loaded. ROM or flash memory may contain, among other software code, Basic Input-Output system (BIOS) which controls basic hardware operation such as interaction with peripheral components. Applications resident with computer system 210 are generally stored on and accessed via computer readable media, such as hard disk drives (e.g., fixed disk 244), optical drives (e.g., optical drive 240), floppy disk unit 237, or other storage medium. Additionally, applications may be in the form of electronic signals modulated in accordance with the application and data communication technology when accessed via network modem 247 or interface 248 or other telecommunications equipment (not shown).

Storage interface 234, as with other storage interfaces of computer system 210, may connect to standard computer readable media for storage and/or retrieval of information, such as fixed disk drive 244. Fixed disk drive 244 may be part of computer system 210 or may be separate and accessed through other interface systems. Modem 247 may provide direct connection to remote servers via telephone link or the Internet via an internet service provider (ISP) (not shown). Network interface 248 may provide direct connection to remote servers via direct network link to the Internet via a POP (point of presence). Network interface 248 may provide such connection using wireless techniques, including digital cellular telephone connection, Cellular Digital Packet Data (CDPD) connection, digital satellite data connection or the like. For example, while scan device 230 (e.g., an x-ray machine, ultrasound, etc.) and/or PACS 260 may be directly connected to bus 212, alternatively such systems may be accessed through network interface 248.

Many other devices or subsystems (not shown) may be connected in a similar manner (e.g., document scanners, digital cameras and so on). Conversely, all of the devices shown in FIG. 2 need not be present to practice the present disclosure. Devices and subsystems may be interconnected in different ways from that shown in FIG. 2. Operation of a computer system such as that shown in FIG. 2 is readily known in the art and is not discussed in detail in this application. In health care environments, the system of FIG. 2 may optionally include scan device 230 (such as an x-ray machine, ultrasonic scanner, or MRI) and may have a connection with PACS 260. Software source and/or object codes to implement the present disclosure may be stored in computer-readable storage media such as one or more of system memory 217, fixed disk 244, optical disk 242, or floppy disk 238. The operating system provided on computer system 210 may be a variety or version of either MS-DOS® (MS-DOS is a registered trademark of Microsoft Corporation of Redmond, Wash.), WINDOWS® (WINDOWS is a registered trademark of Microsoft Corporation of Redmond, Wash.), OS/2® (OS/2 is a registered trademark of International Business Machines Corporation of Armonk, N.Y.), UNIX® (UNIX is a registered trademark of X/Open Company Limited of Reading, United Kingdom), Linux® (Linux is a registered trademark of Linus Torvalds of Portland, Oreg.), or other known or developed operating system. In some embodiments, computer system 210 may take the form of a tablet computer, typically in the form of a large display screen operated by touching the screen. In tablet computer alternative embodiments, the operating system may be iOS® (iOS is a registered trademark of Cisco Systems, Inc. of San Jose, Calif., used under license by Apple Corporation of Cupertino, Calif.), Android® (Android is a trademark of Google Inc. of Mountain View, Calif.), Blackberry® Tablet OS (Blackberry is a registered trademark of Research In Motion of Waterloo, Ontario, Canada), webOS (webOS is a trademark of Hewlett-Packard Development Company, L.P. of Texas), and/or other suitable tablet operating systems.

Moreover, regarding the signals described herein, those skilled in the art recognize that a signal may be directly transmitted from a first block to a second block, or a signal may be modified (e.g., amplified, attenuated, delayed, latched, buffered, inverted, filtered, or otherwise modified) between blocks. Although the signals of the above described embodiments are characterized as transmitted from one block to the next, other embodiments of the present disclosure may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
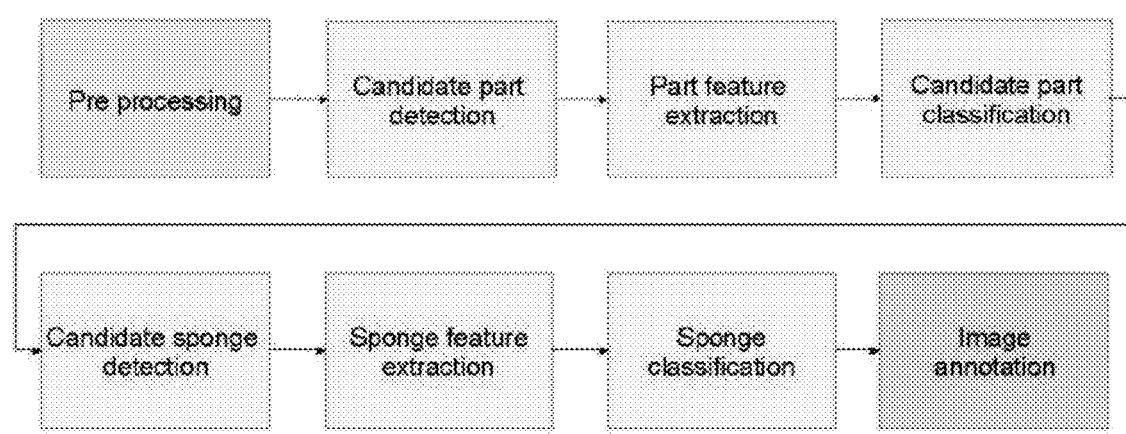
FIG. 3 is a flow chart diagram of the operation of the present invention relating to the overall detection process of an embodiment of the present invention.

FIG. 3 shows a general flow chart of the general operation of an embodiment of the present invention. The general steps, which may be altered in order, pre-processing of an image (the box "pre-processing"), detecting a portion of the image that may have an RFO (the box "Candidate part detection"), extracting a feature from an identified portion (the box "Part feature extraction"), classifying an identified portion for analysis (the box "Candidate part classification"), detection potential sponges in the image (the box "Candidate sponge detection"), extracting potential sponge features for the identified portion (the box "Sponge feature extraction"), classifying the identified features as a particular type of sponge (the box "Sponge classification"), and annotating the image to identify the parts of the image that have been extracted and analyzed for further examination (the box "Image annotation").

FIG. 4A shows an image of a synthetic RFO, while FIG. 4B shows an image of an actual RFO.

FIG. 5A shows an image with multiple potential locations for detection of an object. FIG. 5B shows an image with final determined selected areas where items were identified.

Embodiments of the invention provide a system for RSIs detection. Embodiments involve software to serve as a computer aided diagnosis (CAD) tool to assist radiologists and surgeons in analyzing X-ray images for RSIs by automatically detecting and marking RSI locations. The software automatically analyzes all X-ray images received from the OR whether due to miscount or any other reason and alerts and mark detected foreign objects in predefined categories of sponges and needles. The focus on specific objects such as sponges and needles is optional, in fact, while embodiments of the invention are described in this document generally relating to needles and sponges, this only reflects a particular implementation. Other types of objects may be recognized by creating other object classifier software to detect those other objects and add them to the types of objects detected by embodiments of the inventive system.

Embodiments of the invention involve Core algorithms for RSI detection and recognition. Algorithms for the recognition of RSIs from X-ray images were developed from general recognition algorithms based on machine learning techniques. The algorithms include enhancement designed for RSI detection by removing artifacts and increasing contrast, candidate detection using machine learning and spatial clustering, feature extraction and selection for RSI recognition, and RSI classification. Using a set of classifiers where each classifier is trained for specific conditions such as anatomical region, object type, and exposure level. Thus, embodiments of the invention have designed a special classifier to identify specific conditions selected. Exemplary embodiments noted in this disclosure relate to certain types of sponges and needles our system, other embodiments may easily adapt to new objects by training the classifiers for them.

Further embodiments involve data collection for training and testing. Developing detection algorithms according to an approach of embodiments of the invention may rely on a large number of features and have a large training set. This is particularly so since embodiments use a set of classifiers that are suited to specific cases. Typically, the prevalence of RSIs in X-ray images is low, embodiments of the invention rely in part on collecting realistic images with RSIs. This is based on actual X-ray images of patients as well as images in which RSIs are placed before taking the X-ray image. The objective of the collection is to improve testing results.

Embodiments of the invention may also be involved in Validation studies. Embodiments may be tested by integrating software into a PACS system and analyzing operating room X-ray images for RSIs. Since the prevalence of RSIs in actual cases is typically extremely low, it is alternatively possible to base validation studies on actual X-ray images obtained from procedures in which surgical foreign objects are commonly left in or on the patient while taking the image. These may be manually or semi-automatically annotated and in conjunction with tools necessary for efficient annotation. The validation studies may include comparison of software evaluation to the performance of a human observer both in terms of accuracy and speed.

Embodiments of the invention provide automated RSI detection in X-ray images using one or more of several main steps: enhancement, detection, and recognition. The details of this sequence are shown in FIG. 5. In addition, for the purpose of generating training and testing data, an alternative approach involves superimposing segmented X-images of selected foreign objects on patient images that do not in actuality contain the foreign objects of interest. This allows the magnification of the amount of available data by several folds. The magnification of the data enhances development of embodiments of the invention. Without magnification, training data may take much longer to gather and assemble a sufficient quantity necessary for supervised learning algorithms.

The performance criterion employed for each of these steps involves improvement in recognition rates on actual data. That is, a goal oriented approach is employed by which an algorithm or a key parameter is considered useful only if it improves overall recognition results on actual data. For example, a specific algorithm for enhancement is considered useful only if it improves overall recognition results.

The enhancement approach employed manipulates certain regions of the intensity histogram so as to increase the contrast of specific regions by manipulating the cumulative distribution function. Targeting separately three different regions: dark, normal, and bright, the detection rate is increased in low contrast regions. Each region is processed separately using an individually trained classifier.

Candidate detection is based on the detection of edges in the image using an automatically computed threshold parameter to guarantee a certain number of candidates. Each retained edge pixel defines a small box region around it and a mutual exclusion criterion is applied to get unique candidates. Features, as described below, are extracted for each box region and are used to train and apply a classifier. Using support vector machines and decision tree classifiers based on testing, classifiers were enhanced. However, in principle the method may use any other supervised learning classifier. After classification, candidate box regions are grouped using a spatial clustering algorithm and form candidate RFIs. Additional features are extracted for each RFI candidate and used these for training and classification of an additional classifier.

The features used relate to edge points count and distribution (based on covariance), gradient angle histogram, segmented pixel distributions, contour properties, connected components, and junction points. The features are normalized to values between 0 and 1 except for histogram features which are normalized so that the histogram has an area of 1. Feature vectors are produced comprising 100-200 feature values and use feature selection techniques to identify key features. The features used are intensity and rotation independent.

Finally, for superimposing foreign object X-ray images onto patient images the intensity of the foreign objects are normalized to match the one at the location where it should be superimposed. The objects are then superimposed at random locations using random scale and orientation and random contrast. The random values are drawn from a normal distribution with distribution parameters estimated from actual images. The superposition is performed by segmenting the objects and using the segmented image as a mask for blending, employing pyramid blending.

Since the incidence of RSIs in actual X-ray images is typically extremely low, other sources of validation data may be used. Using a dedicated PACS server, tens of thousands of X-ray images that are taken in the OR for any reason (not just for miscount events) are collected. The collection is both prospective and retrospective. The collection may be split into two subsets. The first may be a set of images containing RSIs taken in procedures where foreign objects are left in or on the patient intentionally. This set also includes images taken due to miscount—although typically this number is extremely small. The second set may have the remaining images. These do not contain RSIs. In addition X-ray images in which RSIs are placed before taking the image may be used.

The assessment of the algorithms and system is conducted using a 10 fold cross validation procedure thus guaranteeing that training data is excluded from testing. The classifiers used provide a probability measure and this is used to produce an ROC curve which provides a comprehensive assessment of performance. Finally, the performance of a human observer is compared to that of the automated system on a subset of images to establish a baseline for interpreting the performance results.

Embodiments of the system of the present invention, as being based on supervised learning in a high dimensional feature space, benefits from increasing amounts of data. Thus as those system embodiments are operated and increasing amounts of data are continuously collected, the collected data is used to improve performance. Further, during system operation, it is possible that there are cases where the system misses an RSI while it is detected by a radiologist. Such cases may be flagged and used to improve the performance of the various embodiments.

To assess the approach of embodiments of the present invention, preliminary studies were performed involving actual X-ray images in which variously deformed sponges of specific types were present. The images involve a phantom and turkey models and each image had an average of 2-3 sponges in it. In addition, actual patient images were used that had clutter due to wires and surgical instruments but that did not have any sponges in them.

The test collection images were semi-automatically labeled by marking the area of each sponge in the collection using a set of pixels that cover it. Then a tight axis-aligned bounding box was obtained for each sponge. These are considered as positive box locations. In addition to the positive box locations, automatically negative box locations were extracted. The negative box locations are locations that are identified by the algorithm as candidates. This is done so that specificity may be computed. Overall, correct detection was detected when a detected box sufficiently overlaps with a positive window.

Illustration of results we obtain are shown in FIG. 6. The left side of the figure shows the intermediate classified candidate locations with green boxes indicating RSI locations, whereas the right side shows the final classification results. The cyan boxes show the known locations and the yellow ones show the identified locations. As observed, the algorithm is not affected by clutter in the image. After performing 10 fold cross validation on a 790 image test collection and generating a ROC curve by varying the detection threshold of the detection probabilities, performance was evaluated. Using the optimal point on the curve resulted in 509 true positives, 25,611 true negatives, 27 false positives, and 52 false negatives. This translates to 0.99 specificity, 0.90 sensitivity (recall), 0.95 precision, 0.99 accuracy, and 0.92 F-measure.

Algorithm 1 (Detect specific foreign objects in X-ray images) involves collecting validation data containing actual patient X-ray images with RSIs. Data to train classifiers for foreign object detection may be collected using Algorithm 2 (CollectGenerate training data). The type of image may be classified using Algorithm 3 (Classify image type). The image and generate three versions (normal, dark, bright) versions of it may be enhanced using Algorithm 4 (RSI oriented image enhancement). Thereafter process each of the image versions separately. Candidate foreign object locations may be detected using Algorithm 5 (Detect candidate locations). Foreign object locations may be classified using Algorithm 6 (Classify candidate locations). Cluster detected object locations may result from using Algorithm 7 (Cluster candidate locations). Foreign object clusters may be classified using Algorithm 8 (Classify foreign objects). Report detection results may be created using Algorithm 9 (Report detection results). Continue to collect data and perform incremental training for each of the algorithms along or in combination so that each may learn from failed cases to improve performance.

Algorithm 2 (Collect training data) involves obtaining thousands or tens of thousands of X-ray images and marking the location and structure of foreign objects.

Algorithm 3 (Classify image type) defines types of interest (e.g. chest images or abdominal images and/or underexposed images or overexposed images, etc.) and labels a training set.

Extract features for each image type using Algorithm 13 (Compute features) that may involve classifying the image type using a supervised learning algorithm such as the SVM or random forest algorithm.

Algorithm 4 (RSI oriented image enhancement) involves smoothing the image to remove noise using a Gaussian filter. This may be in conjunction with enhancing the lower range of intensities to increase the contrast in them using Algorithm 11 (Enhance given intensity ranges).

Algorithm 5 (Detect candidate locations) involves detecting locations of edges with high magnitude of image gradient. The steps include: Computing a threshold parameter to control the number of candidates using Algorithm 12 (Compute a threshold parameter for candidate generation); Defining a box region around each candidate; and excluding box regions whose center is included in other box regions.

Algorithm 6 (Classify candidate locations) involves extracting candidate locations from a labeled training data. The true identity of each extracted location may be marked as positive if it substantially overlaps with a known object location, and as negative otherwise. Further, features in each box may be extracted using Algorithm 13 (Compute features), using the labeled data train a supervised learning algorithm such as the SVM or random forest algorithm, and using the model produced by the training classify candidates in the test data.

Algorithm 7 (Cluster candidate locations) involves clustering detected positive boxes that are near each other and far from other positive boxes using a spatial clustering algorithm. Detected negative boxes that are near each other and far from other negative boxes are clustered using a spatial clustering algorithm, and further features in each candidate cluster (positive and negative) may be extracted using Algorithm 13 (Compute features).

Algorithm 8 (Classify foreign objects) involves extracting candidate locations from a labeled training data. The true identity of each extracted location may be marked as positive if it substantially overlaps with a known object location, and as negative otherwise.

Features in each box may be extracted using Algorithm 13 (Compute features) using the labeled data train a supervised learning algorithm such as the SVM or random forest algorithm, or using the model produced by the training classify candidates in the test data.

Algorithm 9 (Report detection results) involves ignoring foreign objects that are of no interest, and marking detected objects of interest on the image by superimposing an axis aligned box around each detected relevant foreign object. A confidence measure for each detection using probabilities may be returned by the classifier and indicate the detection confidence next to each superimposed box. Alerts may be produced if specific foreign objects are detected with sufficient confidence, using additional information if such is available (e.g. knowledge of miscount).

Algorithm 11 (Enhance given intensity ranges) involves giving a low intensity range of [0, L], stretch intensities in this range to [0,255] thus saturating intensities above L, or alternatively a high intensity range of [H, 255], stretch intensities in this range to [0,255] thus saturating intensities below H.

Algorithm 12 (Compute a threshold parameter for candidate generation) involves setting a desired number of candidates as a percentage of the number of pixels in the image or as an absolute value. Edge detection is performed using gradient magnitudes above a threshold H to initiate edge tracking, starting from locations detected in the previous stage so long as the connected edge points have gradient magnitudes above a threshold L. Further, starting with an initial value for L and H, their proper value may be searched such that the total number of edge pixels is close to the desired number of candidates. In the search scan the values of H and for each value of H scan the values of L.

Algorithm 13 (Compute features) involves selecting pixels in a box region in the area of interest, the segmenting the local box region using an adaptive segmentation technique. Connected components in the box region are then detected, along with the contours of connected components and edges in the box region. Junction points are then detected and the gradient vectors of all the pixels in the box region are determined to compute features relating to edge points count and distribution (based on covariance) or relating to gradient angle histogram. Features may then be computed relating to segmented pixel distributions, contour properties, connected components, and junction points. Feature values may be normalized to be between 0 and 1 except for histogram features which are normalized so that the histogram has an area of 1.

While one or more embodiments of this invention have been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method to detect specific foreign objects in an image scan, the method comprising the steps of:
    classifying an image;
    detecting possible foreign object locations based upon the classifying step;
    enhancing at least one of the possible foreign object locations, creating at least one additional enhanced image;
    classifying and clustering detected possible foreign object locations; and
    analyzing clusters for presence of foreign objects and reporting any detected foreign object.

2. The method of claim 1 wherein the step of enhancing further comprising the steps of:
    generating data to train classifiers for foreign object detection, the data including a plurality of images, then for each of the plurality of images:
    classifying the image by type;
    enhancing the image producing several enhancement image versions;
    detecting candidate foreign object locations in each of the image versions;
    classifying foreign object locations in each of the image versions;
    clustering detected object locations in each of the image versions;
    classifying clusters in each of the image versions;
    reporting detection results in each of the image versions; and
    learning from new and failed cases to improve performance.

3. The method of claim 2 wherein the step of generating training data additionally comprises:
    obtaining a plurality of X-ray images;
    superimposing foreign object images onto each of the plurality of X-ray images randomly; and
    marking location and structure of the objects onto each of the plurality of X-ray images.

4. The method of claim 2 wherein the step of classifying the image by type additionally comprises:
    extracting features for each image type;
    using machine learning techniques to train a classifier; and
    classifying each image with an associated type.

5. The method of claim 2 wherein the step of enhancing the images additionally comprises:
    smoothing the images to remove noise and create a normal version;
    enhancing a lower range of intensities to increase contrast and create a dark version;
    enhancing a higher range of intensities to increase contrast and create a bright version; and
    processing each of the dark, bright, and normal image versions for detection separately.

6. The method of claim 2 wherein the step of detecting candidate locations additionally comprises:
    detecting locations of edges and high image gradient magnitude;
    computing a threshold parameter to control how many candidate locations are detected;
    defining a box region around each candidate location; and
    excluding box regions whose center is included in other box regions.

7. A method of claim 6 wherein the step of classifying foreign object locations additionally comprises:
    determining which of the box regions intersect segmentation of foreign objects, based on the known superposition in the case of synthesized images or a manual labeling in the case of actual images, and labeling intersecting box regions as positive and any remaining box regions as negative;
    extracting features in each box region;
    using machine learning techniques to train feature classifiers based on positive and negative box regions examples; and
    applying the classifiers to detect box regions with objects in test images.

8. The method of claim 7 wherein the steps of clustering and classifying object locations additionally comprises:
    clustering detected positive box regions using spatial considerations;
    clustering detected negative box regions using spatial considerations;
    extracting features in each candidate cluster, both positive and negative clusters;
    using machine learning techniques to train a classifier for both positive and negative clusters; and
    applying classifiers to detect clusters with objects in test images.

9. The method of claim 2 wherein the step of reporting detection results additionally comprises:
    ignoring foreign objects that are of no interest;
    marking the detected objects on the image;
    computing a confidence measure for each detection; and
    producing alerts if specific foreign objects are detected with sufficient confidence.

10. The method of claim 3 wherein the step of superposition of objects allows amplifying available training data which is otherwise limited in actual images.

11. The method of claim 3 wherein the step of superposition of objects allows efficient and accurate marking of position and structures of objects which is otherwise difficult and cost prohibitive in actual images.

12. The method of claim 3 additionally comprising:
segmenting actual X-ray images of foreign objects of interest to form a first mask;
using morphological thinning to thin the first mask so as to form a second mask;
randomly selecting a position, orientation, scale, and intensity of superimposed objects;
adjusting intensity of superimposed objects to match intensity of background where superposition occurs;
warping the foreign object images according to random parameters;
blending superimposed objects with an underlying image at locations of the first mask to produce a combined image; and
smoothing the combined image at locations of the second mask using Gaussian filter.

13. The method of claim 3, wherein different image types including those based on anatomical region, exposure level, clutter level, allow for improved classification results by custom training a separate classifier for each image type.

14. The method of claim 5, additionally comprising:
enhancing a given range of low intensities by stretching intensities in the range between zero and a lower threshold value, thus saturating intensities above the lower threshold value; and
enhancing a given range of high intensities by stretching intensities in the range between a higher threshold value and a maximum value, thus saturating intensities above the higher threshold value.

15. The method of claim 6, additionally comprising:
performing edge detection using a low gradient magnitude threshold to initiate edge tracking, and a higher gradient magnitude threshold to proceed with edge tracking once initiated; and
searching for correct low and high threshold values that will produce a set number of components by performing a line search procedure.

16. The method of claim 6, additionally comprising:
segmenting the box region using an adaptive segmentation technique;
using segmented components to compute features; and
using image gradients to compute features.

17. The method of claim 7, additionally comprising:
finding clusters of box regions that have sufficient overlap with each other thus forming detected object candidates;
segmenting each detected object candidate using an adaptive segmentation technique;
using segmented components to compute features; and
using image gradients to compute features.

18. The method of claim 9, additionally comprising:
superimposing an axis aligned box around each detected relevant foreign object; and
indicating detection confidence next to each superimposed box; and
taking into account additional information, including knowledge of miscount, from a medical procedure.

19. The method of claim 16, additionally comprising:
computing features relating to edge points count and distribution, including features based on covariance;
computing features relating to gradient angle histogram;
computing features relating to segmented pixel distributions;
computing features relating to contour properties;
computing features relating to connected components;
computing features relating to junction points; and
normalizing feature values to be between 0 and 1 except for histogram features which are normalized so that the histogram has an area of 1.

* * * * *